United States Patent
van der Lely et al.

[11] Patent Number: 6,164,051
[45] Date of Patent: *Dec. 26, 2000

[54] MACHINE COMBINATION, A RAKE AND PICK-UP AND DISPLACING MEMBER, AS WELL AS A METHOD

[75] Inventors: Olaf van der Lely, Zug, Switzerland; Norbert van Hemert, Rotterdam; Alfonsus Jacobus van den Engel, Schiedam, both of Netherlands

[73] Assignee: Maasland N.V., Maasland, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 09/054,467

[22] Filed: Apr. 3, 1998

Related U.S. Application Data

[63] Continuation of application No. PCT/NL97/00451, Jul. 31, 1997.

[30] Foreign Application Priority Data

Aug. 6, 1996 [NL] Netherlands .......................... 1003745

[51] Int. Cl.⁷ .......................... A01D 76/00; A01D 78/00; A01D 80/00; A01D 84/00
[52] U.S. Cl. .................................. 56/367; 56/372
[58] Field of Search ............... 56/365, 367, 370, 56/372, 366, 344

[56] References Cited

U.S. PATENT DOCUMENTS

| | | | |
|---|---|---|---|
| 2,168,266 | 8/1939 | McElwain | 56/376 |
| 2,751,745 | 6/1956 | Magee | 56/372 |
| 2,761,270 | 9/1956 | Blaser et al. | 56/DIG. 21 |
| 3,884,022 | 5/1975 | Landolt | 56/364 |
| 4,403,468 | 9/1983 | Yoder | 56/370 |
| 4,738,092 | 4/1988 | Jennings | 56/372 |
| 4,748,803 | 6/1988 | MacMaster et al. | 56/372 |
| 4,777,788 | 10/1988 | Laquerre | 56/376 |
| 4,785,614 | 11/1988 | Schoenherr | 56/365 |
| 4,793,129 | 12/1988 | Ehrhart et al. | 56/370 |

(List continued on next page.)

FOREIGN PATENT DOCUMENTS

| | | |
|---|---|---|
| 1248763 | 1/1989 | Canada . |
| 0290059A2 | 11/1988 | European Pat. Off. . |
| 0543312B1 | 5/1993 | European Pat. Off. . |
| 0706751A1 | 9/1995 | European Pat. Off. . |
| 0709019A1 | 5/1996 | European Pat. Off. . |
| 2077562 | 12/1981 | United Kingdom . |
| 2155297 | 9/1985 | United Kingdom ..................... 56/344 |
| 2194875 | 3/1988 | United Kingdom . |
| 2215971 | 10/1989 | United Kingdom . |

OTHER PUBLICATIONS

Grimm: "Hay Teders, Beat the Weather ... Cut Drying Time 30–50%", relevant pp. 2, 3, 4.

Primary Examiner—Robert E. Pezzuto
Assistant Examiner—Arpad Fabian Kovacs
Attorney, Agent, or Firm—Penrose Lucas Albright

[57] ABSTRACT

A racking, pickup and windrowing implement for moving crop lying on the ground laterally which includes a first machine comprising rake wheels that rotate about substantially vertical axes and move the crop inwardly where it is picked up by a pick-up implement and conveyed to a displacing device which displaces the crop laterally and discharges it back on the ground in a windrow which is proximate the boundary of the strip being worked or, in one embodiment, the windrow is formed by discharging it laterally from the displacing device at a further distance away from the boundary of the strip being worked which is substantially equal to the width of the strip being worked. The displacing device comprises two endless members in series. Such endless members and the rake wheels are foldable upwardly so that the entire machine combination has a width suitable for transport. The pick-up implement can also be raised above the ground by a hydraulic piston and cylinder associated with the coupling device which connects the first machine to the pick-up implement.

23 Claims, 2 Drawing Sheets

U.S. PATENT DOCUMENTS

| | | | |
|---|---|---|---|
| 4,809,490 | 3/1989 | Swanson | 56/370 |
| 4,910,951 | 3/1990 | Reilly et al. | 56/376 |
| 5,155,986 | 10/1992 | Kelderman | 56/865 |
| 5,163,277 | 11/1992 | Fransgaard | 56/366 |
| 5,203,154 | 4/1993 | Lesher et al. | 56/366 |
| 5,231,826 | 8/1993 | Jennings | 56/11.4 |
| 5,272,860 | 12/1993 | Baril et al. | 56/366 |
| 5,450,717 | 9/1995 | Delperdang et al. | 56/366 |
| 5,507,139 | 4/1996 | Delperdang et al. | 56/366 |

# MACHINE COMBINATION, A RAKE AND PICK-UP AND DISPLACING MEMBER, AS WELL AS A METHOD

RELATED APPLICATION

This is a Continuation Application of application Ser. No. PCT/NL97/00451, filed Jul. 31, 1997.

FIELD OF THE INVENTION

The present invention relates, inter alia, to a machine combination for moving crop lying on the ground sidewardly. More particularly, it relates to the combination of a first machine for raking crop lying on the ground laterally relative to the ground, and a second machine having pick-up means for picking up crop raked by the first machine and displacing the crop transversely relative to the direction of travel of the combination.

BACKGROUND OF THE INVENTION

A similar machine has been referred to as "Vermeer Twin Rakes". By means of this machine, crop collected by two rake elements is brought together into a central windrow. For the purpose of further processing, a pick-up device is drawn by a drawbar which is connected to the raking device comprising two rake elements. Crop is deposited on the ground, immediately behind the pick-up device, into a smaller windrow. The machine has the disadvantage that the number of windrows created is relatively large, so that follow-up machines, if any, such as bale presses or pick-up wagons, which usually have a larger capacity than the raking device, are used inefficiently under certain circumstances. This drawback can be obviated by means of a rake which is known from European Patent Application EP-A-0 709 019, in that the rake members are arranged to form a so-called side delivery rake. By means of this side delivery rake, crop collected by two rake members can be deposited into a single windrow at the side of the machine. However, such a machine has the drawback that the distance over which the crop is moved over the ground by the rake members is very large and there is thus a risk that contamination of the crop is increased. This drawback occurs particularly with crops such as hay and silage, which are used as feed crops for animals, such as cows.

SUMMARY OF THE INVENTION

The present invention has for its object to obtain a favorable machine or machine combination of the above-mentioned type, by means of which, on the one hand, the number of windrows to be deposited per hectare is limited as much as possible and, on the other hand, the contamination of the crop is minimized. According to the invention, this is achieved by adding a second machine which comprises a displacing device for displacing and depositing the crop picked up transversely to the direction of travel.

The invention will now be further explained with reference to the accompanying drawings, in which:

BRIEF DESCRIPTION OF THE DRAWINGS

Corresponding elements in the drawings have been indicated by the same reference numerals. The invention is not restricted to the embodiments shown and described which serve only to illustrate the inventive concept.

DETAILED DESCRIPTION OF THE PREFERRED EMBODIMENT

Figure 1:
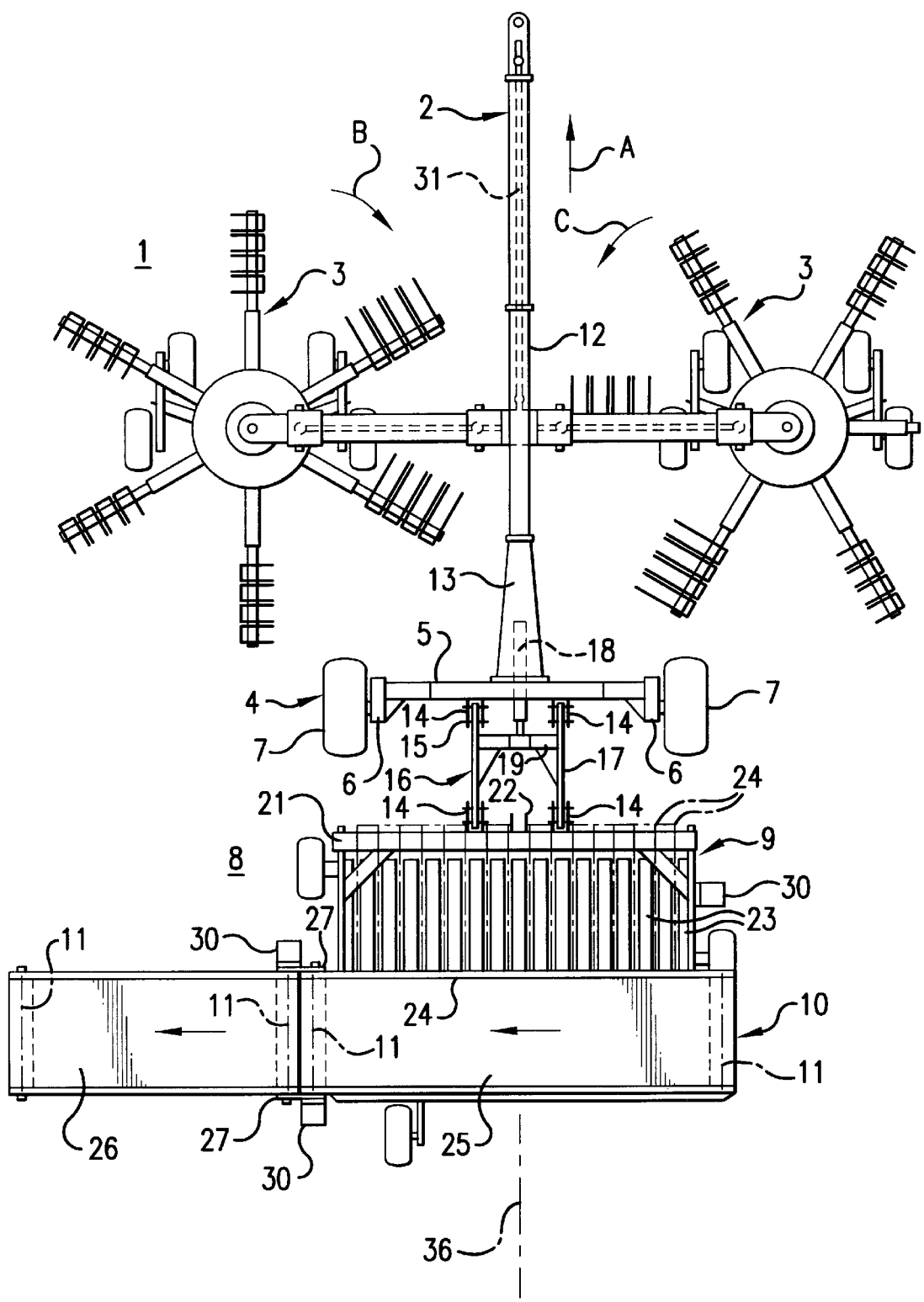
FIG. 1 shows schematically, in plan view, a machine according to the invention.

FIG. 1 shows a machine combination of a rake or raking device 1 comprising rotors or rotary raking members 3 and a pick-up and displacing device 8. In the present embodiment, the latter is provided with a three-point linkage and also can be used separately as a pick-up and displacing device 8. Raking device 1 is provided with a drawbar 2 capable of being coupled with a tractor, which drawbar 2, near the rear of rotors 3, is supported by a pair of wheels 4. Via arms that are pivotably connected with the drawbar, rotors 3 are upwardly pivotable to a transport position in which they are arranged substantially vertically. Each of the arms provided for this purpose is capable of telescoping in such a manner that, measured horizontally and transversely to direction of travel A, the outer boundary of a windrow deposited by rotors 3 is located at most one and one-half meters from the drawbar. The pair of wheels 4 include a bridge 5 directed transversely to direction of travel A, said bridge 5 being provided near its ends with downwardly extending supports 6 for wheels 7. In the drawing, raking device 1 is designed as a central delivery raking device. The pick-up and displacing device 8 consists of a pick-up device 9, which comprises a pick-up device or "pick-up" which is known per se, and a displacing device 10 suitable for transporting laterally, that is transversely to the direction of travel A, crop picked up from the ground by pick-up device 9. In the present embodiment, the displacing device is produced so as to include an endless flexible displacing element, drivable and rotatable about shafts 11 which are disposed in the direction of travel A. The endless flexible displacing element may be a chain including take-along elements, such as rods, disposed transversely to the direction of travel thereof, or a closed conveyor made of rubber or synthetic material, possibly provided with take-along profiles.

The rear half parts 12 and 13 of drawbar 2, or at least the portion of drawbar 2, where imaginary circles circumscribed by rotors 3 approach each other very closely, is at a height above the ground so that the rake elements of rotors 3 and crop raked by them can pass thereunder. For the linkage of the pick-up and displacing device 8, bridge 5 is provided with lugs 14 which receive a hitch 15 by means of pivot shafts 15 extending horizontally and transversely to the direction of travel A. Coupling device 16 is designed as a quadrangle hinge construction including two pairs of arms 17 located above each other. It is pivotable upwardly and downwardly relative to bridge 5 by means of an adjusting and lifting element 18, operable from the tractor, which, in this embodiment, is designed as a hydraulic piston and cylinder unit that is pivotably disposed under bridge 5 and between part 13 and a bracket 19 that extends upwardly from the lower coupling arms 17.

The pick-up and displacing device 8 comprises a frame including inter alia a frame beam 21 disposed transversely and at a considerable distance above pick-up device 9. Coupling device 16 engages the frame via corresponding pairs of lugs 14 and pivot shafts 15. The pick-up and displacing device 8 is also provided with a centrally disposed upper pair of lugs 22, so that it is also adapted to be coupled to a tractor's three-point lifting hitch. According to the invention, said provision also enables a combination in which a rake is coupled to a tractor's front lifting hitch and the pick-up and displacing device is connected to the rear lifting hitch of a tractor.

FIG. 1 shows the upper sides of guide strips 23, bent in a U-shape, between which strips 23 the tines of the pick-up are moving, and by means of such tines crop lying on the ground is lifted and conveyed over guide strips 23 in a rearward direction to displacing device 10. In a specific embodiment, the guide strips 23 adjoin at their rear ends a transversely extending frame portion 24 and guide strips 23 are disposed at a slightly higher level than the upper side of displacing element 25 of displacing device 10, which is arranged therebehind.

Displacing device 10 preferably comprises two endless elements 25 and 26, of which the first one extends horizontally and transversely, and adjacent to the pick-up device 9 in a proper manner. The second displacing element 26 is coupled with the first drive element via pivot arms 27 that are pivotable about the drive shafts of the displacing elements. The rounded off ends of the first and the second displacing elements 25 and 26, which are facing each other, are disposed during operation so as to overlap each other at least to some extent to provide a proper transfer of crop from the first displacing element to the second one. For achieving a transport position, second displacing element 26 and arms 27 pivot together about a pivot shaft included in first displacing element 25. For adjustment in height of the outer end, second displacing element 26 is pivotable and adjustable about a pivot shaft which is included in second displacing element 26 and is coupled with arms 27. In the embodiment shown, both pivotal axes coincide with parallel axes of rotation 11. Axes 11 are axes of rotation for shafts that preferably also constitute the drive shafts of the respective displacing elements 25 and 26. The movement of arms 27 relative to the frame of the relevant displacing elements 25 and 26 is capable of being locked near both ends of an arm 27. Displacing elements 25 and 26, as well as the pick-up device 9, are driven by means of hydraulic motors 30. In the above-described preferred embodiment, hydraulic motors 30 are disposed at opposite sides of the two displacing elements 25 and 26. Via a slide included in the machine transversely to the direction of travel, displacing device 10 is movable relative to the pick-up device 9 and fixable in a number of desired positions in order to adjust where the crop is deposited.

Pick-up and displacing device 8 is preferably provided with a hydraulic unit, which is driven via an extension of drive shaft 31, which is provided on raking device 1 for the drive of rotors 3, and which is capable of being coupled with the power take-off shaft of a tractor. According to the invention, to this end raking device 1 is provided with a gear box having a rearwardly directed power take-off shaft. Due to this, the drive of the raking device can be passed on, via a coupling shaft, to a machine to be coupled with raking device 1, in this case a pick-up and displacing device 8. Therefore, the invention also relates to a raking device 1, which is provided with coupling means for coupling a following machine and with a drive unit having a rearwardly directed power take-off shaft.

The function of the above-described construction is characterized in that crop lying about on the ground is raked by the rotors towards the middle of the machine and is deposited there in a windrow. This windrow is picked up from the ground by the pick-up 9 and is transported to a place outside the working width of the rake and deposited there. This has the advantage that the crop is displaced over the ground by over one-half the working width of the rotors at the most. This limits the risk of contamination with earth or clods, thereby reducing the value of the crop to a considerable extent, while furthermore the risk of losing crop is limited. Nevertheless, by turning at the end of a working run, the machine is adapted to deposit the material raked of two working runs into one windrow. This provides for the very efficient use of follow-up machines, such as bale presses or pick-up wagons. The machine has also the advantage that the raking device can be used as a central delivery raking device when desired, such as in the case of a lighter tractor and an uncoupled pick-up and displacing device, thus enlarging the possibilities of using machinery of contractors optimally and in a flexible manner.

In a preferred embodiment, the working width of the pick-up 9 corresponds to not greater than the legal transport width in many countries, which usually amounts to three meters. The construction in accordance with the invention further permits depositing the crop collected by the two rotors into two windrows located at some distance from each other. According to the invention, these windrows can be deposited closely within the imaginary lines, extending in the direction of travel, that indicate the maximum working width of rake 1; because of the fixed orientation of the pick-up relative to the rotors, a complete picking up of the two windrows is guaranteed. Due to this, the working width of the raking device included in the construction according to the invention can be increased by the distance between the windrows deposited by the two rotors; and the unraked crop between the two windrows is still picked up by the pick-up. In this manner, the working width can be increased in practice by approximately one meter, i.e., more than 10%.

In another embodiment, the pick-up and displacing device can be connected with a tractor via a drawbar that is specifically designed for the purpose. The drawbar has a "cat's back", i.e., is designed in such a manner that it can reach from the frame beam 21 over a rake that is suspended in the three-point lifting hitch of a tractor and can easily be linked with a pivotable drawing point on the tractor. In this case, the pick-up and displacing machine is provided with running wheels which are coupled with its frame and are preferably arranged behind displacing device 10 or thereunder. The drawbar is preferably connected pivotably about a vertical shaft with frame 21, while an adjusting element, which is capable of being operated from the tractor, is disposed between the drawbar and frame beam 21. By means of said adjusting element, the machine can be positioned behind the raking device, either centrally behind a so-called central delivery raking device including two or more rotors, such as known from EP-A-290 059, or next to a side delivery raking device including one or more rotors. In the latter case, second displacing element 26 is omitted or adjusted into an inoperative position, so that the collected crop is deposited immediately outside the working width of the machine combination. Such machine combinations, as described in the foregoing, have the advantage that it is possible to continue the use of existing raking devices while increasing their capacity in a favorable manner.

Figure 2:
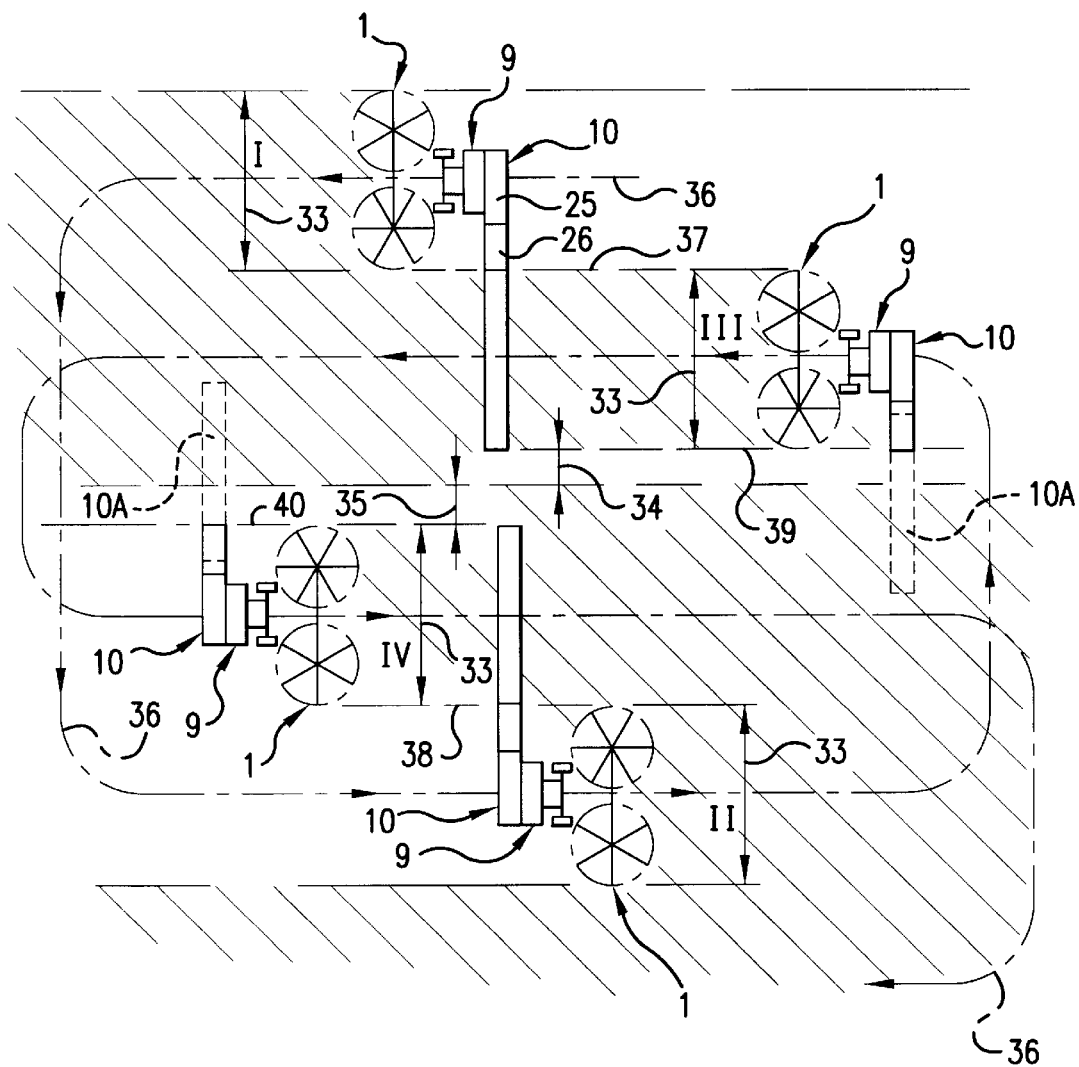
FIG. 2 illustrates schematically an alternative construction and a method which can be practiced by means of the machine according to the invention.

In again another embodiment of the invention, the earlier described embodiments, such as schematically shown in FIG. 2, may be provided with a displacing device 10 which is extended so that the crop picked up is deposited over a distance of at least one working width of the machine outside the rake width of the machine. The extension of the displacing device is supported in any workable manner within the skill of the art such as by means of a supporting construction, constituted, for example, by ropes capable of being pulled and which are kept at a certain height by means of apparatus on displacing device 10. Near the boundary of the working width of the raking device, by means of arms 27 which are longer than in the previous embodiment, the extension can be pivoted hydraulically into an inoperative position above the end of displacing element 26. In this position of the displacing device, shown in dashed lines by reference character 10A in FIG. 2, crop picked up is deposited immediately beside the boundary of the working strip of the machine. In this position, the machine always makes a working run along windrow strips 34 and 35 which are adjacent to each other. FIG. 2 furthermore illustrates a method in which the crop collected in four working runs, indicated by Roman numerals I–IV, is deposited into one single windrow indicated by reference numbers 34 and 35. In this method there are preferably carried out two consecutive working runs, without an adjustment of the extension into or out of the operative position being required. The extension is preferably adjusted in the first and the second working runs. Of course, the embodiment shown in FIG. 2 of a method in which the pick-up and displacing device 8 is used can also be applied in combination with one of the earlier mentioned types of raking devices.

The invention furthermore relates to:

A machine combination in which the displacing device 10, which comprises displacing elements 25 and 26 is adapted to deposit the crop near the boundaries 37, 38, 39 and 40 of a strip of ground (I–IV) that has been worked by a first machine comprising raking device 1;

A machine combination in which the crop is moved sidewardly by second machine comprising a displacing device 10 and is deposited by said second machine 8 outside the strip of ground that has been worked by first machine 1;

A machine combination in which the crop is deposited by second machine 8 at a place adjacent to the strip of ground that has been worked by the first machine 1;

A machine combination in which the crop is deposited at a distance, corresponding at least to the working width of first machine 1, outside the strip of ground that has been worked by first machine 1;

A machine combination in which second machine 8 is provided with coupling means suitable for coupling to first machine 1 or suitable for coupling to the rear lifting hitch of a tractor;

A machine combination in which first machine 1 is constituted by a raking device including at least one rake member 3 that is rotatable about an upwardly extending shaft;

A machine combination in which the displacing device 10 has such dimensions that the crop picked up can be moved sidewardly at least over the working width of one rake member 3;

A machine combination in which at least second machine 8 is provided with coupling or pivot means with the aid of which second machine 8, at least during operation, is fixedly positioned in the lateral direction of the combination relative to the first machine;

A machine combination in which displacing device 10 has such dimensions that material picked-up can be moved sidewardly at least over a distance, corresponding at least about the working width of the first machine, beyond a lateral boundary;

A machine combination in which displacing device 10 is adjustable in lateral direction relative to the pick-up device 9;

A machine combination in which the first machine is a central delivery raking device, in particular a motor-driven rake 1;

A machine combination in which first machine 1 comprises a frame 2 which is supported behind rake members 3 by a pair of wheels 4 and which machine 1 is provided near its rear end with coupling means comprising components 14, 15, 16, 17, 18 and 19 for coupling second machine 8;

A machine combination in which first machine 1 is provided with a gear box having a preferably rearwardly directed power takeoff shaft;

A machine combination in which second machine 8 can be put into and out of operation;

A machine combination in which coupling means comprising components 14, 15, 16, 17, 18 and 19 which include adjusting element 18 for placing second machine 8 into and out of operation;

A machine combination in which pick-up means 9 are arranged between two rake members 3 rotating in opposite directions, in particular centrally therebetween;

A machine combination in which displacing device 10 comprises at least one endless displacing elements 25 and 26 in the form of a motor-driven flexible conveyor;

A machine combination in which the machine combination comprises first machine 1, which is capable of being coupled to the front lifting hitch of a tractor, and second machine 8, which can be coupled to the rear lifting hitch of this tractor; and A machine combination in which the machine combination is constituted by a machine 1, which is capable of being coupled to the rear of a tractor, and second machine 8, which is capable of being coupled to the rake.

Although we have disclosed the preferred embodiments of our invention, it is not restricted to the description herein, as such, but also relates to all details in the drawings as well as alternatives, other adaptations and modifications within the scope of the following claims:

Having disclosed out invention, what we claim as new and to be secured by Letters Patent of the United States of America is:

1. A raking, pickup and windrowing implement for moving crop lying on the ground which comprises a first machine that includes means for raking crop lying on the ground laterally relative to the ground and the implement direction of travel, and a second machine provided with pick-up means for picking up crop raked by said first machine from the ground, said second machine comprising a displacing device for displacing said crop picked up by said pick-up means transversely relative to the operative direction of travel of the implement to form a windrow which is substantially outboard of the strip of ground being worked by the first machine, said strip of ground being worked having a greater width than the width of said second machine without considering said displacing device.

2. The implement in accordance with claim 1, wherein said displacing device deposits said crop proximate the boundary of a strip of ground that has been previously raked by said first machine.

3. The implement in accordance with claim 1, wherein said displacing device moves said crop sidewardly relative to the operative direction of travel of the implement and deposits it outside said strip of ground that has been worked by said first machine.

4. The implement in accordance with claim 3, wherein said crop is deposited in a windrow adjacent to said strip of ground that has been worked by said first machine.

5. The implement in accordance with claim 3, wherein said crop is deposited by said displacing device at a distance outside of the strip of ground that has been worked by said first machine which is at least equal to the width of the strip of ground that has been worked by said first machine.

6. The implement in accordance with claim 1, wherein said second machine comprises coupling means which is selectively adaptable for coupling said second machine to said first machine or for coupling said second machine to a rear lifting hitch of a tractor.

7. The implement in accordance with claim 1, wherein said first machine comprises a raking device, said raking device including at least one rake member that is rotatable upwardly extending axis.

8. The implement in accordance with claim 1, wherein said first machine comprises a pair of rake members which rotate in opposite directions and rake crop lying on the ground to said second machine, said displacing device having such dimensions that crop picked up by said second machine is moved sidewardly by said displacing device for a distance which is greater than the working width of a said rake member.

9. The implement in accordance with claim 1, comprising coupling means between said first machine and said second machine, said coupling means substantially fixedly preventing relative movement in a lateral direction between said first machine and said second machine during raking operations of the first machine.

10. The implement in accordance with claim 4, wherein said displacing device is dimensioned so that material picked up by said second machine and conveyed laterally by said displacing device is displaced sidewardly for a distance beyond the strip worked by said first machine which substantially corresponds to the working width of said first machine beyond said boundary.

11. The implement in accordance with claim 1, wherein said displacing device is adjustable in a lateral direction relative to said pick-up means.

12. The implement in accordance with claim 1, wherein said means for raking a crop lying on the ground laterally relative to the ground comprises a central delivery raking device which includes motor means for operating said central delivery raking device.

13. The implement in accordance with claim 1, wherein said means for raking crop lying on the ground laterally relative to the ground comprises rake members, said first machine comprising a frame which is supported behind said rake members by a pair of wheels and coupling means at said frame's rear aspect for coupling said first machine to said second machine.

14. The implement in accordance with claim 1, wherein said first machine comprises gear means and linkage means connected to said gear means which includes means for being connected to a power take-off shaft of a tractor.

15. The implement in accordance with claim 1, comprising lifting means for raising said second machine so that it is inoperable.

16. The implement in accordance with claim 15, comprising coupling means for coupling said first machine to said second machine, said lifting means associated with said coupling means.

17. A machine in accordance with claim 1, wherein said means for raking crop lying on the ground laterally relative to the ground comprises two rake members rotating in opposite directions to move crop to a strip of ground between them, said pick-up means being arranged behind two said rake members to pick up crop from said strip which has been raked by said rake members.

18. The implement in accordance with claim 1, wherein said displacing device comprises an endless flexible displacing element and motor means for driving said endless flexible displacing element.

19. The implement in accordance with claim 1, wherein said first machine comprises coupling means for coupling said first machine to a front lifting hitch of a tractor, said second machine comprising-further coupling means for coupling said second machine to a rear lifting hitch of a tractor.

20. The implement in accordance with claim 1, wherein said first machine comprises coupling means for coupling it to the rear of a tractor, said means for raking crop lying on the ground laterally relative to the ground comprising a raking device, said second machine comprising coupling means that detachably connects said second machine to said raking device.

21. A method of collecting crop lying on the ground wherein said crop is collected by moving it laterally relative to the ground to the central portion of a strip of ground, raising said crop so collected from the central portion of said strip of ground by an agricultural implement which is traveling in a direction normal to the lateral movement of said crop relative to the ground, moving said crop which has been raised by said agricultural implement laterally relative to said agricultural implement and said direction and discharging said crop from said agricultural implement laterally onto the ground to form a windrow outboard of said strip of ground.

22. A method in accordance with claim 21 wherein said step of discharging said crop from said agricultural implement laterally on the ground to form a windrow, forms said windrow proximate the strip of ground from which said crop was collected by moving it laterally relative to the ground.

23. A method in accordance with claim 21, wherein said step of discharging said crop from said agricultural implement laterally on the ground to form a windrow forms said windrow at a lateral distance from the boundary of the strip of ground from which the crop was collected which is substantially the same distance as the width of the said strip from which said crop was collected by moving it laterally relative to the ground.

* * * * *